(12) United States Patent
Dörfler et al.

(10) Patent No.: US 6,945,276 B2
(45) Date of Patent: Sep. 20, 2005

(54) VALVE WITH UNILATERALLY CONSTRAINED PIEZOELECTRIC BENDING ELEMENT AS ACTUATING DEVICE

(75) Inventors: Erich Dörfler, Landsberg-Erpfting (DE); Bernhard Russ, Peiting (DE); Günther Strasser, Rottenbuch (DE); Rainer Teltscher, Waakirchen (DE)

(73) Assignee: Hygrama AG, Zug (CH)

( * ) Notice: Subject to any disclaimer, the term of this patent is extended or adjusted under 35 U.S.C. 154(b) by 142 days.

(21) Appl. No.: 10/461,882

(22) Filed: Jun. 16, 2003

(65) Prior Publication Data

US 2003/0230346 A1 Dec. 18, 2003

(30) Foreign Application Priority Data

Jun. 18, 2002 (AT) .......................................... A 917/2002

(51) Int. Cl.[7] .......................... F16K 11/04; F16K 31/56
(52) U.S. Cl. ...................... 137/625.44; 251/11; 251/75; 251/243; 251/303
(58) Field of Search ...................... 137/625.44; 251/11, 251/75, 242, 243, 298, 303

(56) References Cited

U.S. PATENT DOCUMENTS

| | | | | |
|---|---|---|---|---|
| 3,876,137 A | * | 4/1975 | Kelly et al. | 236/48 A |
| 4,101,076 A | * | 7/1978 | Bart | 239/584 |
| 5,040,567 A | * | 8/1991 | Nestler et al. | 137/625.44 |
| 6,173,744 B1 | * | 1/2001 | Frisch et al. | 137/625.65 |
| 6,386,506 B1 | * | 5/2002 | Cox | 251/11 |
| 6,499,509 B2 | * | 12/2002 | Berger et al. | 137/625.65 |
| 6,595,436 B2 | * | 7/2003 | Kirzhner et al. | 239/102.2 |

* cited by examiner

Primary Examiner—John Fox
(74) Attorney, Agent, or Firm—Dykema Gossett PLLC

(57) ABSTRACT

Valve with a displaceable actuating device that controls the movements of at least one actual sealing element for opening and closing, and the actuating device is loaded with an elastic element essentially in a perpendicular direction relative to the direction of displacement, and the longitudinal axis of the actuating device and the force exercised by the elastic element are aligned in one position of the actuating device between its two extreme positions. In order to realize a valve that can be electrically switched using minimal currents and that is characterized, in particular, by its small construction size but that is still able to achieve large regulating distances, the actuating device is a unilaterally constrained piezoelectric bending element.

15 Claims, 3 Drawing Sheets

VALVE WITH UNILATERALLY CONSTRAINED PIEZOELECTRIC BENDING ELEMENT AS ACTUATING DEVICE

BACKGROUND OF THE INVENTION

1. Field of the Invention

The invention relates to a valve with a displaceable actuating device which controls the movements of at least one actual sealing device for opening and/or closing, and the actuating device is loaded with an elastic element, essentially perpendicularly in relation to the direction of displacement and the longitudinal axis of the actuating device as well as the force that is exercised by the elastic element are aligned in one position of the actuating device between its two extreme positions; and/or the invention relates to a valve with a displaceable actuating device that controls the movements of at least one actual sealing device for opening and/or closing, and an elastic element acts essentially perpendicularly in relation to the direction of displacement of the actuating device, and the longitudinal axis of the actuating device as well as the force that is exercised by the elastic element are essentially aligned.

2. The Prior Art

In many kinds of valves the sealing device or an actuating device that moves the sealing device is preloaded in one of two directions by way of, for example, elastic elements. The preload can possibly also be created utilizing the forces that develop during the displacement of the sealing device or actuating device. In most instances, however, this has a negative impact on the switch-over dynamics of the valve at least in one direction, and the valve requires a high operating energy input in order to overcome this preload.

On the other hand, valve constructions in which the two end positions are held stable by way of a preload on the basis of the geometry of the sealing or actuating device are also known in the art—if necessary, with the assistance of at least one spring element—while the force of an elastic element must be overcome in order to switch over and, after running through the first section of the total working stroke, the elastic element supports the further switch-over action. DE 197 20 849 A1 describes an example of such a valve; in this instance, two actors are envisioned for the switch-over action that engage the carrier element for the actual sealing device.

The object of the invention is a valve that can be electrically switched using low currents and that is characterized by its small construction size but that still allows for realizing large regulating distances.

SUMMARY OF THE INVENTION

To achieve this objective according to the invention the actuating device is realized as a unilaterally constrained piezoelectric bending element. With their very high density of force accompanied by minimal triggering power and good switch-over dynamics, these bending elements, which are in fact known in the art, have all prerequisites for a large stroke in the presence of the most minimal dimensions. In conjunction with the support of the change-over on the part of the elastic element, which exercises its largest force in the neutral position of the bending element and the applied force of which drops parallel to the increasing displacement and thereby the decreasing displacement force of the bending element, it is possible to utilize the full no-load stroke of the bending element and it is possible to increase the achievable stroke considerably—which is accompanied in the valves, in turn, by an increase of the flow-through output.

Advantageously, at least one of the actual sealing devices can be mounted to the bending element or integrated in the bending element.

Due to the fact that it is possible to realize three stable switching states with the piezoelectric bending element, it is possible to provide a multitude of valve variants, provided two sealing devices are mounted or integrated on two opposite sides of the bending element and the sealing devices act in conjunction with two valve seats that are arranged opposite to each other.

In contrast to the first variant, higher sealing forces are achievable with a construction that also provides for one elastic element that essentially acts perpendicularly in relation to the direction of displacement of the actuating device, and the longitudinal axis of the actuating device as well as the force that is exercised by the elastic element are essentially aligned, but in which case the actuating device according to the invention is realized as a unilaterally constrained piezoelectric bending element and the sealing device is loaded by an elastic element essentially perpendicularly relative to the direction of displacement of the actuating device. In this instance as well, it is possible to operate the bending element utilizing its full displacement, and, via the geometric relations, it is possible to adjust the sealing force, the working stroke of the sealing element etc. to the requirements needed in practical applications.

Preferably, the sealing device is arranged with the ability to pivot around an axis with the axis preferably being arranged laterally next to the valve seat.

The force that can be exercised by the bending element is most advantageously utilized if the point of application of the bending element on the sealing device is arranged outside of the plane that is defined by the axis and the valve seat.

Advantageously, another characteristic of the invention envisions that the point of application of the elastic element on the sealing device is arranged outside of the plane that is defined by the axis and the valve seat, preferably that it defines together with the point of application of the bending element on the sealing device an essentially parallel plane relative to a plane that is defined by axis and valve seat.

Higher variability can be achieved with an embodied example of the invention that provides that the sealing device acts in conjunction with two valve seats that are arranged on opposite sides relative to the pivot axis, and, preferably, it is preloaded on one of the two valve seats by way of the elastic element and can be changed over between the two switching positions via the bending element.

The reset force of the bending element can be optimally utilized for the change-over of the valve, provided, according to another characteristic of the invention, the sealing device features a recess that engages the one end of the bending element.

The expanded applicability of the valve construction according to the invention can also be ensured by means of an embodied example envisioning two sealing devices that are arranged independently and opposite of each other, and they are arranged, respectively, with the ability to be swung around an axis, while this axis is arranged, respectively, laterally next to the valve seat.

In this instance, it is possible as well to envision an advantageous further development that provides that each sealing device acts in conjunction with two valve seats on opposite sides vis-à-vis each other relative to a pivot axis, and each sealing element is preferably preloaded by way of the elastic element to one of the two valve seats and can be changed over between the two switching positions using the bending element.

Again, it is possible to utilize the reset forces from the two displacement positions of the bending element if the two sealing elements form together in their basic position a recess that is open toward the bending element and that engages one end of the bending element.

The applicability and variability of the valve can be further enhanced if a pressure sensor is integrated in the valve.

In this instance, advantageously, it is also possible to integrate the electronic control device that triggers the bending element inside the valve and connect it to the pressure sensor as well.

It is also advantageous in this context if the electronic control device is equipped with an external input for a desired value signal.

The subsequent description is intended to illustrate the invention in more detail using the embodied examples that are depicted in the enclosed drawings.

DETAILED DESCRIPTION OF THE PREFERRED EMBODIMENTS

Figure 1A:
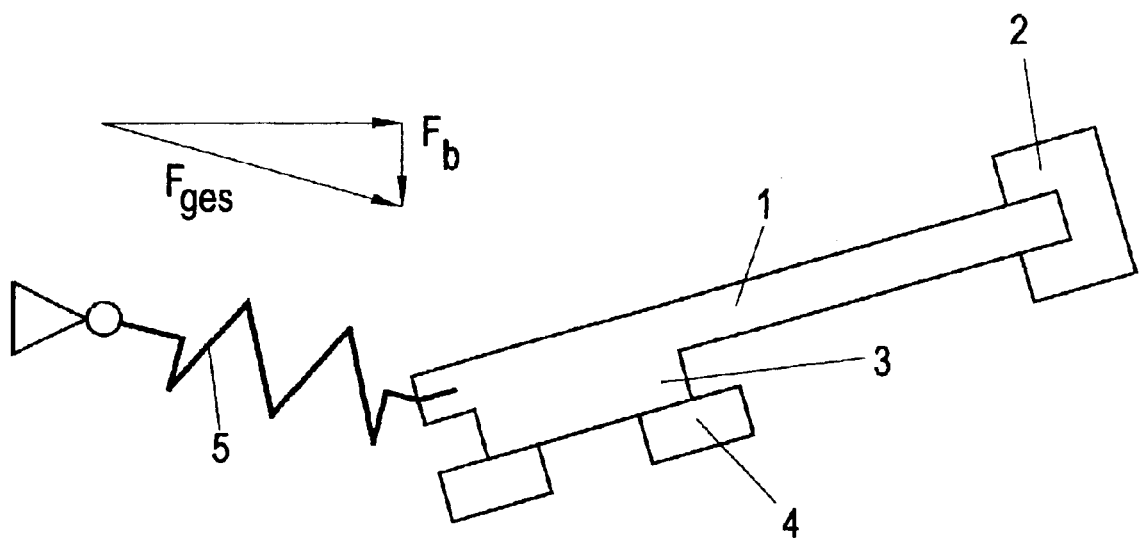
FIG. 1a shows a schematic depiction of a piezoelectric bending element for a valve according to the invention acting in conjunction with a pressure spring and with the valve seat in the closed position.

A piezoelectric bending element 1 is constrained with its one end at a location 2 inside the housing of the valve or in a structure connected therewith. In the resting position that is shown in FIG. 1a, in which no voltage is applied, the bending element 1 pushes a sealing device 3 against a valve seat 4. The closing force consists of the mechanical properties of the bending element 1 and, additionally, the action of the pressure spring 5, with the latter essentially being arranged as aligned with the bending element 1 and/or with the latter enclosing no more than an obtuse angle near 180° with the bending element; thus, the larger force component of the pressure spring acts principally in the longitudinal direction of the bending element 1 and, therefore, in a perpendicular direction relative to the direction of displacement of the bending element. The force in the resting position is determined by the part $F_b$ of the spring force $F_{ges}[=F_{total}]$ in the direction of displacement.

Figure 1B:
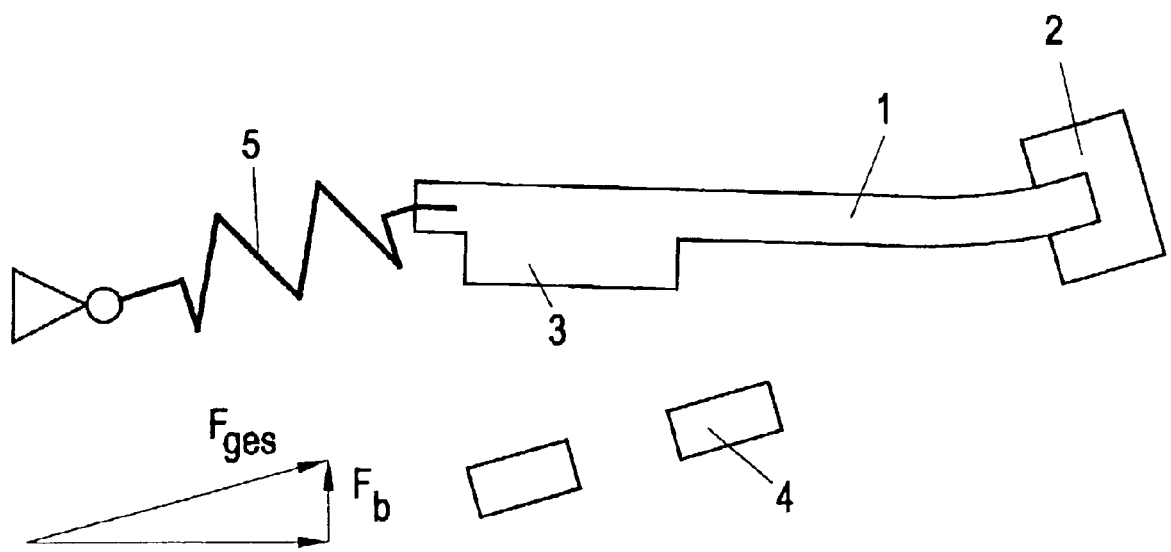
FIG. 1b shows this bending element in its open position.

When a voltage is applied, the bending element 1 is finally displaced into the end position that is depicted in FIG. 1b, and, during this motion, the spring force part $F_b$ acting in the direction of the displacement decreases until it disappears entirely when the pressure spring 5 and the bending element 1 are completely aligned in an intermediate position. If the bending element 1 is displaced further, at which point the pressure spring 5 once again encloses an obtuse angle near 180° with regard to the bending element 1, but this angle is directed toward the opposite side relative to the position in FIG. 1a, the spring force part $F_b$ that is now acting in the direction of the displacement is supporting the continued displacement of the bending element 1 into the open end position. Advantageously, the maximum displacement position is symmetrical with regard to the resting position in order for the bending element 1 to have sufficient reset force due to its elasticity when the voltage is turned off so that it is able to overcome the spring force part $F_b$ that is acting in the direction of the displacement and in the opening direction.

Figure 2:
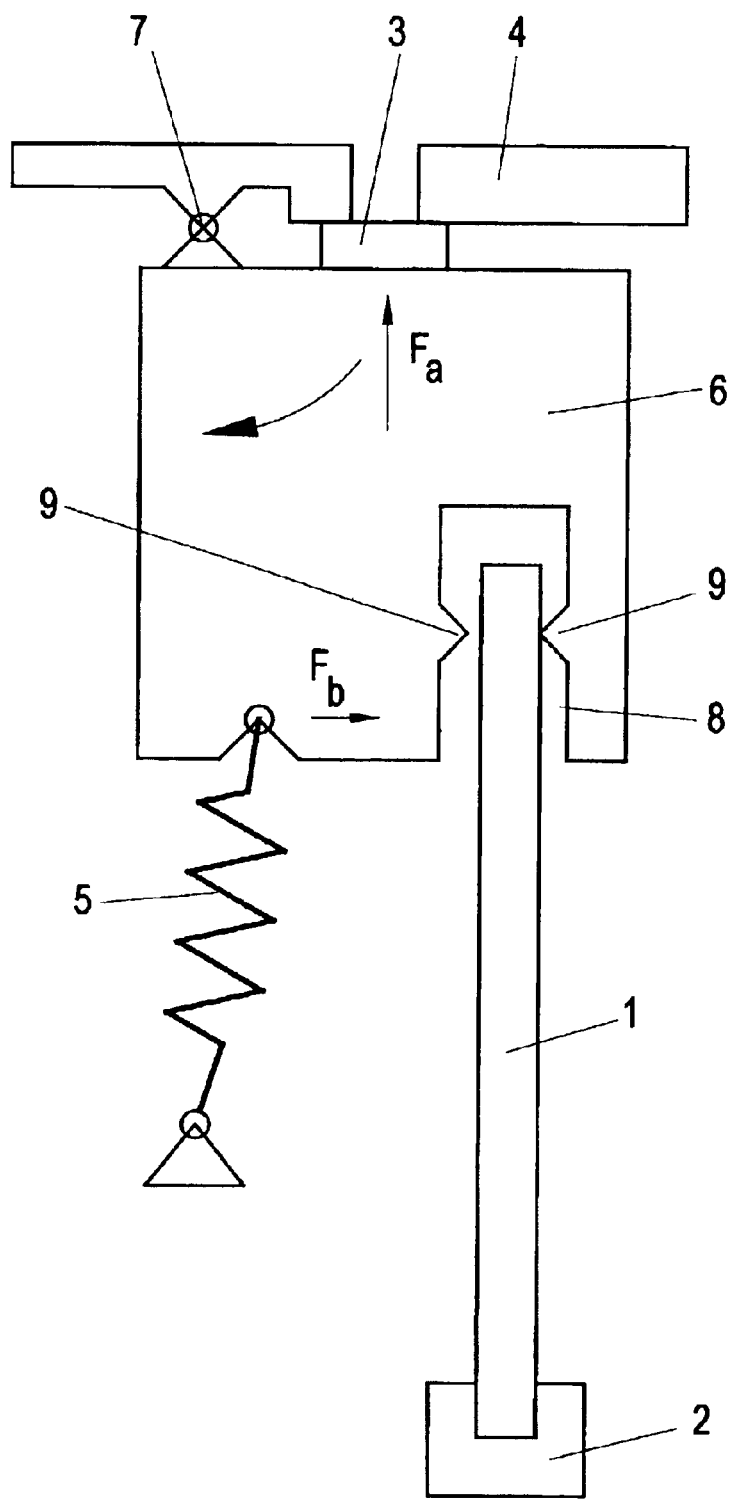
FIG. 2 is a schematic representation of a bending element for the second valve variant according to the invention with pivoting sealing device in the closed position.

In the second valve variant, as shown in FIG. 2, the bending element acts upon a separate sealing device 6 pivoting around an axis 7 that is most times arranged next to the valve seat 4. The actual sealing surface 3 is realized on or fastened to the sealing device 6. In this embodied example, the pressure spring 5 does not directly act upon the bending element 1 but instead, arranged essentially parallel relative to the bending element 1, it acts upon the direction of the valve seat 4 and the sealing device 6. Due to the small angle that the pressure spring 5 encloses with the bending element 1, once again, a minimal part of the spring force of the spring force part $F_b$ acts in the direction of displacement of the bending element 1 and counteracts its displacement when pressure is applied. The closing force $F_a$, corresponding, in principle, to the force $F_{ges}$ of the pressure spring 5 and corresponding to the spring force $F_{ges}$ that acts perpendicularly relative to the displacement of the bending element, is decoupled from this spring force part $F_b$ in the second valve variant, which means it can be envisioned as considerably higher than in conventional systems, including in the above variant that has been described first. With this increased sealing force, the valve can either operate in higher pressure ranges or it is possible to considerably increase the through-flow by way of increasing the diameter of the valve seat 4.

When the bending element 1 is displaced following the application of a voltage—as in the first variant—the force $F_b$, against which the bending element 1 must work, decreases with the increased displacement; it then even becomes reversed, which means that the bending element 1 can be operated with its full displacement in this instance as well. Due to the fact that the free end of the bending element 1 engages in a recess 8 constituting a type of pocket in the sealing device 6, it is possible, when turning off the voltage, to reset the sealing device 6 by way of the bending element—against the spring force part $F_b$—via the point of balance into the closed position.

Figure 3:
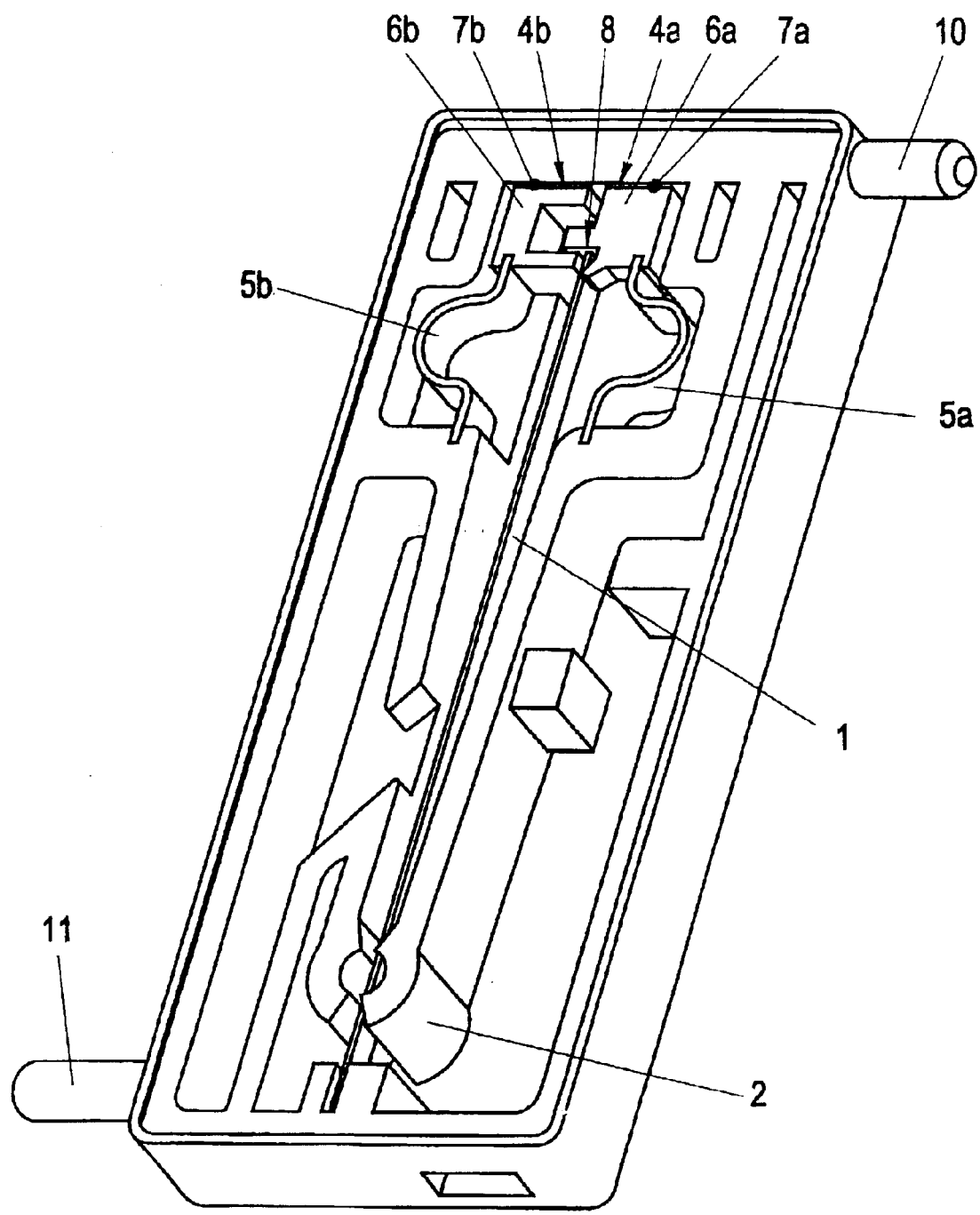
FIG. 3 depicts a perspective view of a 3/3-way valve in accordance with the second valve variant utilizing two sealing devices including bending element as joint actuating device.

The friction on the pivot bearings 7 of the sealing device 6 and on the points of application of the pressure spring 5, while it is possible to realize the pressure spring—as shown in FIG. 3—as a sheet metal bending part, can be reduced on the sealing element 6 if these pivot bearings 7 and/or points of application on the sealing device 6 are realized as cutting edges. The friction between the bending element 1 and the sealing device 6 can also be reduced via cutting edges 9 or by way of another way of minimizing the surface roughness of at least one of the construction components 1, 6, preferably of both construction components. This can also be achieved, for example, by pushing a cap with a minimal surface roughness onto the bending element 1.

The valves of both variants are represented in their simplest embodied examples with a valve seat 4; this means they are represented as 2/2-way valves. However, on the opposite side relative to the sealing device 3 with regard to the bending element 1 in FIG. 1 and the side that is opposite relative to the valve seat 4 with regard to the pivot axis 7 in FIG. 2, it is also possible to envision another embodied example of the two variants with a further valve seat; in the latter instance, the seat is preferably arranged in a plane that is rotated by 90° relative to the first valve seat 4, essentially parallel with regard to the bending element 1. This way, it is possible to realize 3/2-way valves with piezoelectric actuation.

But it is also possible to realize a 3/3-way valve with only one piezoelectric bending element 1; a preferred embodied example of this is shown in FIG. 3. A bending element 1 that is constrained at a location 2 in the housing is used for this purpose, and said element can be displaced around its resting location in both directions, for example, by applying voltage with different preceding signs. When displacing, e.g,. to the right in FIG. 3, a sealing device 6a—in principle, as described above—is displaced around an axis 7a that is located essentially opposite of the point of application of the spring 5a, and the passage through a first valve seat 4a is opened at which location, for example, compressed air is on stand-by from a compressed air supply source via the hook-up 10. Subsequent to opening of the sealing device 6a, this compressed air passes through the valve housing to a consumer hook-up 11 on the valve from which point it reaches the consumer. In this context, it is crucial that the pocket 8 in the sealing device 6a is only active in its displaced position while avoiding any obstruction of the movement of the bending element 1 in the direction opposite to the displacement that has been described above. During this, the second sealing device 6b, loaded by the spring 5b, remains in the closed position.

In the course of a displacement action in the opposite direction, e.g., in FIG. 3 to the left, the second sealing device 6b is in fact moved, whereby a second, in the present instance a valve seat 4b that is arranged parallel relative to the first valve seat 4a, is opened. This allows establishing the connection from the consumer hook-up 11 to a ventilation hook-up (not shown). When the valve is in this state, the spring 5a holds the first valve element 6a in the closed position.

When in the closed position, the two sealing devices 6a, 6b form jointly the pocket 8 where the displaceable end of the bending element 1 engages.

Because a single bending element 1 is used for both valve seats, a very compact realization of the 3/3-way valve is realized. In this instance, an expansion with two sealing seats for each sealing devices 6a, 6b is also conceivable.

Advantageously, additional construction parts can be integrated in the valve housing, i.e., a sensor that measures the pressure. A standard sensor is used for this purpose. The possibilities range from a housed sensor to an exposed sensor cell that is mounted on a valve-specific plate (analogous to the "chip on chip board" in the field of microelectronics). Consequently, it is possible to integrate an electronic plate into the valve housing that carries, at its simplest stage, only a pressure sensor and that is intended to ensure the connection of the bending element and of the pressure sensor to an interface (plug) Subsequently, the valve (including the pressure sensor) is connected, via a cable, to an electronic control/regulator. This electronic control is then able to regulate the pressure at the consumer end. The electronic control could also be incorporated in its miniaturized form in the valve. The valve thus constitutes an autonomous pressure control that must be loaded with a supply voltage as well as a signal (desired value) and that outputs a controlled pressure.

We claim:

1. A valve with a displaceable actuating device (1) which controls the movements of at least one actual sealing device (3) for opening and closing, and the actuating device is loaded by an elastic element (5) essentially in a perpendicular direction relative to the direction of displacement, and the longitudinal axis of the actuating device and the force that is exercised by the elastic element are aligned in one position of the actuating device between its extreme positions wherein the actuating device (1) is realized as a unilaterally constrained piezoelectric bending element.

2. A valve as claimed in claim 1 wherein at least one of the actual sealing devices (3) is mounted on or integrated with the bending element (1).

3. A valve as claimed in claim 2 wherein the two sealing devices (3) are mounted or integrated on sides of the bending element (1) that are opposite relative to each other, and wherein the sealing devices engage with two valve seats (4) that are arranged opposite relative to each other.

4. A valve with a displaceable actuating device (1) that controls the movements of at least one actual sealing device (3) for opening and closing, and an elastic element (5) acts essentially in a perpendicular direction relative to the direction of displacement of the actuating device (1), and the longitudinal axis of the actuating device and the force that is exercised by the elastic element are essentially aligned wherein the actuating device (1) is realized as an unilaterally constrained piezoelectric bending element and the sealing device (6) is loaded by the elastic element (5) essentially in a perpendicular direction relative to the direction of the displacement of the actuating device (1).

5. A valve as claimed in claim 4 wherein the sealing element (6) is arranged with the ability to pivot around an axis (7) that is preferably arranged laterally next to the valve seat (4).

6. A valve as claimed in claim 5 wherein the point of application of the bending element (1) on the sealing device (6) is arranged outside of the plane that is defined by the axis (7) and the valve seat (4).

7. A valve as claimed in claim 6 wherein the point of application of the elastic element (5) on the sealing device (6) is arranged outside of the plane that is defined by the axis (7) and the valve seat (4), preferably defining with the point of application of the bending element (1) on the sealing device (6) a plane that is essentially parallel relative to the plane that is defined by the axis (7) and the valve seat (4).

8. A valve as claimed in claim 7 wherein the sealing device (6) acts in conjunction with two valve seats (4) that are arranged on opposite sides relative to the pivoting axis (7) and wherein, preferably, the sealing device is preloaded via the elastic element (5) on one of the two valve seats (4) and can be changed over between the two switch positions by way of the bending element (1).

9. A valve as claimed in claim 8 wherein the sealing element (2) features a recess (8) that engages one end of the bending element (1).

10. A valve as claimed in claim 4 wherein two sealing devices (6a, 6b) are envisioned that are arranged, independently of each other and with the ability to pivot in opposite directions around the axis (7a, 7b) respectively, and said axis is arranged, respectively, laterally next to the valve seat (4a, 4b).

11. A valve as claimed in claim 10 wherein each sealing device (6a, 6b) acts in conjunction with two valve seats that are arranged on opposite sides relative to the pivot axis (7a, 7b) of the sealing device and wherein each of the sealing elements is preferably preloaded via the elastic element (5)

on one of the two valve seats and can be changed over between the two switching positions by way of the bending element (1).

12. A valve as claimed in claim 11 wherein, in their basic state, the two sealing devices (6a, 6b) in conjunction form a recess that is open toward the bending element (1) and which engages one end of the bending element (1).

13. A valve as claimed in claim 12 wherein a pressure sensor is integrated in the valve.

14. A valve as claimed in claim 13 wherein the electronic control that triggers the bending element (1) is integrated with the valve and is also connected to the pressure sensor.

15. A valve as claimed in claim 14 wherein the electronic control is equipped with an external input for a desired value signal.

* * * * *